United States Patent [19]

Inagaki et al.

[11] Patent Number: 4,823,434
[45] Date of Patent: Apr. 25, 1989

[54] OUTER DOOR HANDLE

[75] Inventors: Akio Inagaki, Okazaki; Masuo Shimomura, Nagoya, both of Japan

[73] Assignee: Aisin Seiki Kabushiki Kaisha, Kariya, Japan

[21] Appl. No.: 109,034

[22] Filed: Oct. 16, 1987

[30] Foreign Application Priority Data

Oct. 17, 1986 [JP] Japan .......................... 61-159697[U]

[51] Int. Cl.⁴ .............................. B60J 9/00; B60J 1/20
[52] U.S. Cl. ................................ 16/115; 16/DIG. 12; 16/DIG. 19; 264/255
[58] Field of Search .... 16/110 R, DIG. 12, DIG. 19, 16/111 R, 115; 264/511, 255

[56] References Cited

U.S. PATENT DOCUMENTS

| | | | |
|---|---|---|---|
| 3,247,550 | 4/1966 | Haines, Jr. ........................... | 264/511 |
| 4,356,230 | 10/1982 | Emanuel et al. ..................... | 264/255 |
| 4,366,109 | 12/1982 | Svoboda .............................. | 264/255 |
| 4,668,460 | 5/1987 | Ongena ............................... | 264/255 |

FOREIGN PATENT DOCUMENTS

| | | | |
|---|---|---|---|
| 3033166 | 4/1982 | Fed. Rep. of Germany ...... | 264/511 |
| 895339 | 5/1962 | United Kingdom ................ | 264/511 |

*Primary Examiner*—Richard K. Seidel
*Attorney, Agent, or Firm*—Oblon, Fisher, Spivak, McClelland & Maier

[57] ABSTRACT

An outer door handle, for example for a vehicle, includes a stationary casing fixed to the door and a handle member movably mounted on the door adjacent the case and connected to the opening mechanism of the door. In order to improve appearance of the handle while maintaining good physical strength, either the handle member or casing is composed of a base portion formed of thermoplastic material having glass fibers, and a thin film laminated on the base portion, the thin film lacking glass fibers.

4 Claims, 1 Drawing Sheet

OUTER DOOR HANDLE

BACKGROUND OF THE INVENTION

1. Field of the Invention

The present invention relates to an outdoor handle for a vehicle, for example, and more particularly to an outer door handle which is made of thermoplastic material.

2. Discussion of the Related Art

Thermoplastic material, as raw material of a conventional outdoor handle, includes therein an amount of glass fiber so as to increase the mechanical strength of the handle. Since the glass fiber extends to an outer surface of the handle, the outer surface of the handle must be smoothed to a fine unevenness during formation of the handle in order to add beauty thereto.

However, the conventional outer door handle has a drawback that the outer surface of the handle is lusterless or dull.

SUMMARY OF THE INVENTION

It is an object of the present invention to provide an outdoor handle having an outer surface with high gloss.

The above object can be achieved by injecting the thermoplastic material including an amount of glass fiber into a mold within which there is a colored thin film made of thermoplastic material. After molding, the resulting outer door handle has an outer surface covered with the colored film and the remainder of the handle has good mechanical strength. By changing the colored thin film, various types of handles may be obtained.

BRIEF DESCRIPTION OF THE DRAWINGS

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
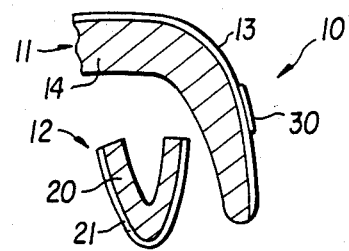
FIG. 1 is a partial cross sectional view of an outer door handle according to an embodiment of the present invention.

Referring now to FIG. 1, an outer door handle 10 of known shape includes a case 11 and a handle member 12. The case is fixedly mounted on a door (not shown). The handle member 12 is movably, for example pivotally, mounted on the door next to the case 11 and is operatively connected to the door opening mechanism of the door in a known manner. The case 11 is constructed by laminating a black-colored thin film 13 made of polycarbonate resin with thickness of 200 micrometers on a base portion 14 made of polycarbonate resin including 10 percent glass fiber by weight.

Figure 2:
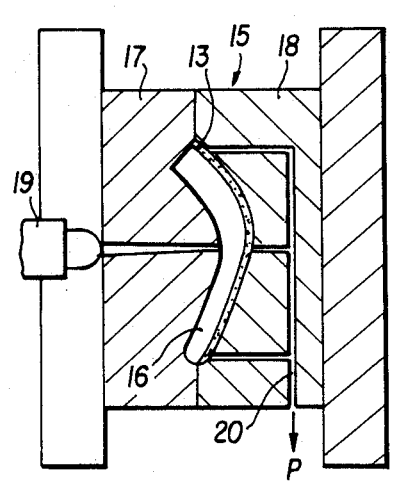
FIG. 2 is a cross sectional view of a mold before injection.
Figure 3:
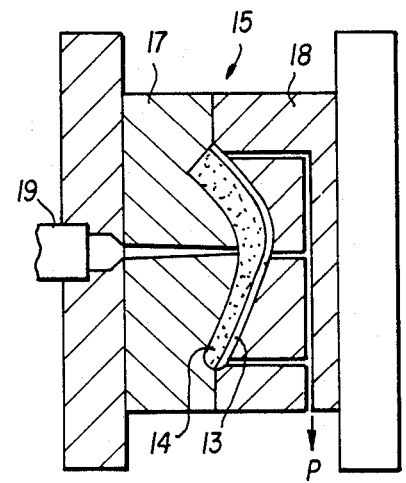
FIG. 3 is a cross sectional view of the mold after injection.

In order to obtain the case 11, an injecting molding method is employed. In detail, as seen from FIG. 2, a mold 15 having a cavity 16 therein is divided into two sections 17 and 18 in the horizontal direction. First, the thin film 13 is set in the cavity on the section 18. For preventing movement of the thin film 13 on the section 18, the thin film 13 is attracted by suction of a vacuum pump P through conduits 20. Thereafter, to form the base portion 14, polycarbonate resin including 10% glass fiber by weight is injected from an injector 19 into the cavity 16 for a time with the vacuum pump P operating. As a result of such injection, the base portion 14 is integrally formed with the colored thin film 13 to obtain the case 11.

The handle member 12 having a base portion 20 and a thin film 21 laminated thereon may be obtained similarly. By changing color or design of the thin film 13 (21), various types of the outer door handles may be obtained. It is noted that a specific pattern or symbol 30 may be previously printed on the thin film 13 and/or 21.

The invention provides improved appearance while maintaining high strength, as shown in Table 1.

TABLE 1

| material | Evaluation Items | | |
|---|---|---|---|
| | Roughness of the outer surface ($\mu$Rz) | Appearance | Mechanical strength (resisting pressure) |
| polycarbonate resin (no glass fiber is included) | less than 3 | good | 100 kg |
| polycarbonate resin (including 10% glass fiber) | 1 to 3 | bad (Glass fiber is raised to the surface of the handle.) | 150 kg |
| embodiment of the present invention | less than 1 | very good | 150 kg |
| polyacetate resin no glass fiber is included) | less than 3 | not so good (Undulation is formed on the surface of the handle.) | 115 kg |
| 66 nylon resin (including 30% glass fiber) | 1 to 10 | very bad (lusterless /Glass fiber is raised to the surface of the handle.) | 125 kg |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An outer door handle comprising:
   a stationary case fixed to a door; and
   a handle member movably mounted on said door adjacent said case;
   wherein at least one of said case and said handle member comprises a base portion formed of polycarbonate resin having therein glass fiber at a rate of 10% by weight, and a thin film of said polycarbonate resin lacking glass fiber laminated on said base portion.

2. An outer door handle according to claim 1, wherein said thin film is of 200 micrometer thickness.

3. An outer door handle according to claim 2 wherein said film has a specific pattern or symbol printed thereon.

4. An outer door handle according to claim 1, wherein said thin film is laminated on said base portion during injection molding thereof.

* * * * *